(12) United States Patent
Junkar et al.

(10) Patent No.: US 9,465,107 B2
(45) Date of Patent: Oct. 11, 2016

(54) SONIC-ASSISTED LOCALIZATION OF WIRELESS DEVICES

(71) Applicants: Martin Junkar, San Jose, CA (US); Lei Yang, Hillsboro, OR (US); Xue Yang, Arcadia, CA (US)

(72) Inventors: Martin Junkar, San Jose, CA (US); Lei Yang, Hillsboro, OR (US); Xue Yang, Arcadia, CA (US)

(73) Assignee: INTEL CORPORATION, Santa Clara, CA (US)

( * ) Notice: Subject to any disclaimer, the term of this patent is extended or adjusted under 35 U.S.C. 154(b) by 443 days.

(21) Appl. No.: 13/801,304

(22) Filed: Mar. 13, 2013

(65) Prior Publication Data

US 2014/0269193 A1 Sep. 18, 2014

(51) Int. Cl.
*G01S 15/06* (2006.01)
*G01S 3/80* (2006.01)

(52) U.S. Cl.
CPC . *G01S 15/06* (2013.01); *G01S 3/80* (2013.01)

(58) Field of Classification Search
CPC ................................. G01S 3/80; G01S 15/06
USPC ......................................................... 367/99
See application file for complete search history.

(56) References Cited

U.S. PATENT DOCUMENTS

| | | |
|---|---|---|
| 2012/0044786 A1 | 2/2012 | Booij et al. |
| 2012/0087212 A1* | 4/2012 | Vartanian et al. ............ 367/118 |
| 2012/0214507 A1 | 8/2012 | Vartanian et al. |
| 2012/0214544 A1 | 8/2012 | Shivappa et al. |
| 2014/0249771 A1* | 9/2014 | Yang et al. ................... 702/150 |
| 2014/0269193 A1* | 9/2014 | Junkar ...................... G01S 3/80 367/99 |
| 2014/0313857 A1* | 10/2014 | Horton ...................... G01S 5/22 367/117 |

FOREIGN PATENT DOCUMENTS

| | | | | |
|---|---|---|---|---|
| CN | 102378918 | | 3/2012 | |
| CN | 105190351 A | * | 12/2015 | ............ G01S 15/06 |
| EP | 2557433 | | 2/2013 | |
| JP | 2011135551 | | 7/2011 | |
| WO | WO 2014134401 A1 | * | 9/2014 | |
| WO | WO 2014163875 A1 | * | 10/2014 | ............ G01S 15/06 |

OTHER PUBLICATIONS

International Search Report and Written Opinion, PCT/ISA/210, PCT/ISA/220, PCT/ISA/237, mail date Jun. 19, 2014.
International Preliminary Report on Patentability mailed Sep. 24, 2015 for corresponding International Patent Application No. PCT/US2014/018378 (10 pages).
Taiwanese Office Action mailed Apr. 22, 2015 for corresponding Taiwanese Patent Application No. 103108730 (10 pages).

\* cited by examiner

*Primary Examiner* — Daniel Pihulic
(74) *Attorney, Agent, or Firm* — Pillsbury Winthrop Shaw Pittman LLP (57) ABSTRACT

Wireless location identification systems, methods, and devices include a wireless device configured to transmit at least one sonic signal operating on at least one acoustic frequency and to receive at least one echo signal indicative of the at least one sonic signal being reflected by objects in a current location, an audio module configured to measure the received at least one echo signal and process the at least one echo signal to extract attributes of the echo signal and generate at least one echo profile characteristic; and logic configured to compare the at least one profile characteristic with previously-stored sonic characteristics that are correlated with pre-identified locations. The current location is then identified as a pre-identified location correlated to the previously-stored sonic characteristics that match the at least one profile characteristic.

20 Claims, 4 Drawing Sheets

SONIC-ASSISTED LOCALIZATION OF WIRELESS DEVICES

TECHNICAL FIELD

This disclosure relates generally to the field of wireless communications, and in particular, to wireless device location identification.

BACKGROUND

With the recent explosion of smart mobile devices and location-based services/applications, such as location-based advertising, product finding, and friend tracking, etc., it has become increasingly important to provide reliable and accurate indoor location sensing. can enable a number of new mobile applications.

Various attempts have been made to achieve indoor location sensing by piggy-backing on existing wireless network systems. For example, with the proliferation of WiFi networks, indoor localization sensing that utilizes WiFi signal strength and/or WiFi timing-based trilateration techniques have been developed. However, while such indoor localization techniques do not require additional infrastructure, they may not guarantee the required accuracy due to the large variation of signal strength in indoor environments. Moreover, because WiFi signals can easily penetrate through walls, it may be difficult to identify different rooms/spaces that are adjacent to each other. As such, wireless network-based indoor localization techniques are not without accuracy and/or reliability issues.

DETAILED DESCRIPTION

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a wireless location identification system that includes a wireless device configured to transmit at least one sonic signal operating on at least one acoustic frequency and to receive at least one echo signal indicative of the at least one sonic signal being reflected by objects in a current location, an audio module configured to measure the received at least one echo signal and process the at least one echo signal to extract attributes of the echo signal and generate at least one echo profile characteristic; and logic configured to compare the at least one profile characteristic with previously-stored sonic characteristics that are correlated with pre-identified locations. The current location is then identified as a pre-identified location correlated to the previously-stored sonic characteristics that match the at least one profile characteristic.

In other embodiments, a wireless location identification method is presented that includes transmitting, by a wireless device, at least one sonic signal operating on at least one acoustic frequency, receiving, by the wireless device, at least one echo signal indicative of the at least one sonic signal being reflected by objects in a current location, measuring the received at least one echo signal, processing the at least one echo signal to extract attributes of the echo signal and generate at least one echo profile characteristic, comparing the at least one profile characteristic with previously-stored sonic characteristics that are correlated with pre-identified locations, and setting the current location as a pre-identified location correlated to the previously-stored sonic characteristics that match the at least one profile characteristic.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Given the nature of RF signals used by wireless networks, the resolution and accuracy of indoor localization sensing techniques that employ such networks may vary significantly. To this end, the disclosed embodiments are directed to a sonic-assisted wireless location identification system and method that employs sonic echo signals to generate a location signature or fingerprint. By generating short pulse sonic signals at audible and/or ultra-sound frequencies, the wireless devices can measure the received sound echo properties, which may then be compared to an echo profile database to identify their current location.

Figure 1:
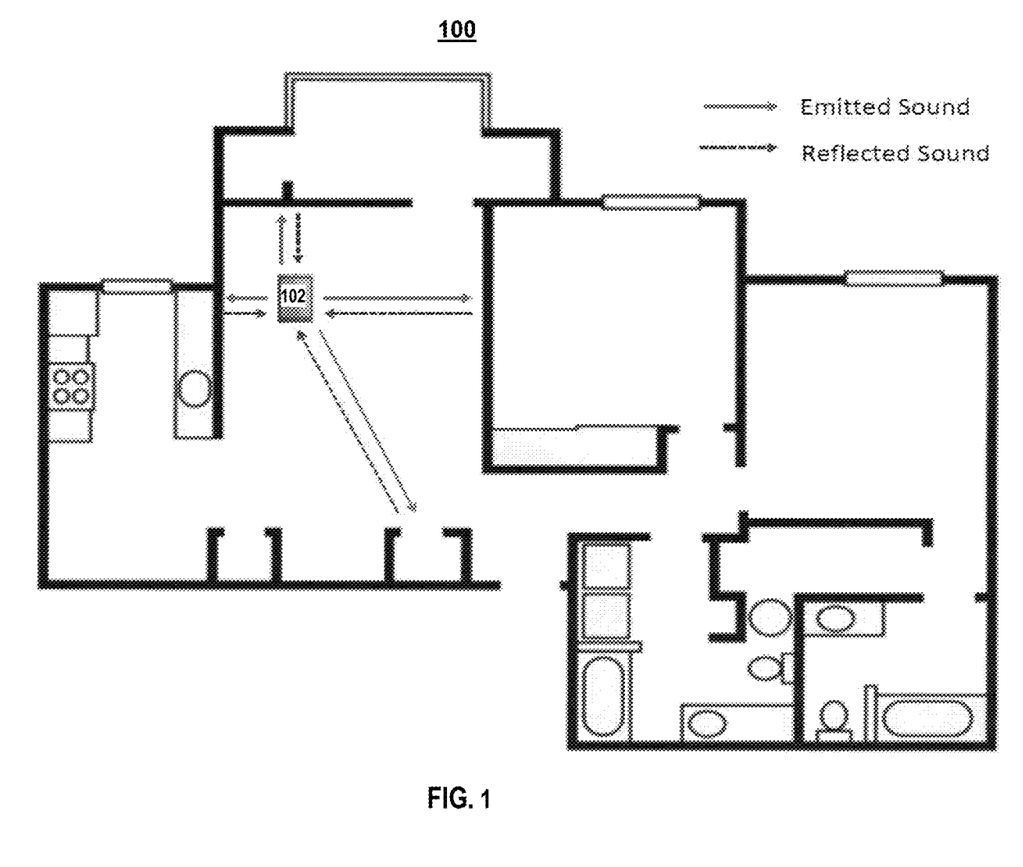
FIG. 1 depicts a diagram of sonic echo effects in indoor environments, in accordance with various aspects and principles of the present disclosure.

FIG. 1 illustrates the sonic echo effects within an indoor environment. It will be appreciated that when a device emits a sound wave, it travels through the space around the device and reflects off of (i.e., bounces back) when it impinges or hits objects within the space, such as, walls, furniture, doors, etc. Such reflection activity rarely occurs with wireless network-based signals operating at radio frequencies (RF), as RF signals are capable of penetrating through objects. For example, as indicated in FIG. 1, wireless communication device 102 emits a sonic pulse (solid line) and receives reflected echo signals (dashed line) as it bounces off of walls and doors in an indoor room. Wireless communication device 102 is then capable of receiving the reflected echo signals and analyze the properties/characteristics of the received reflected echo signals. Because different spaces will exhibit different sonic echo properties/characteristics, i.e., "sonic echo fingerprints," such information may be exploited to accurately determine the wireless device 102 location and even distinguish between adjacent rooms within an indoor space.

In particular, objects at different distances will generate reflected echo signals which will be received by the microphone on wireless communication device 102 at different times and with different amplitudes. The time of reception of the echo signal is generally a function of distance while the amplitude of the received echo is a function of distance and sound reflection properties of the object (e.g., materials, composition, configuration) from which the sonic echoes reflect. Moreover, as wireless devices move in the space, it can also measure the speed and direction of the movement by monitoring Doppler shift of the reflected echo as compared to the emitted sonic frequency.

Figure 2A:
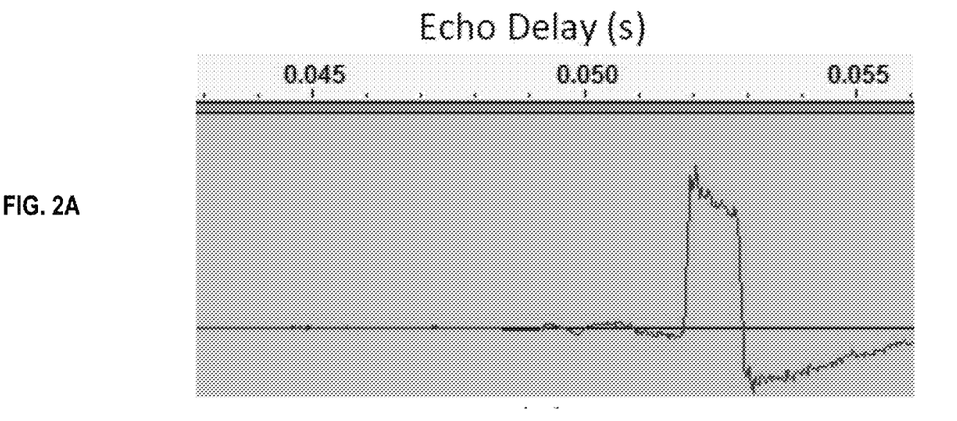
FIGS. 2A, 2B depict sonic echo profile responses, in accordance with various aspects and principles of the present disclosure.
Figure 2B:
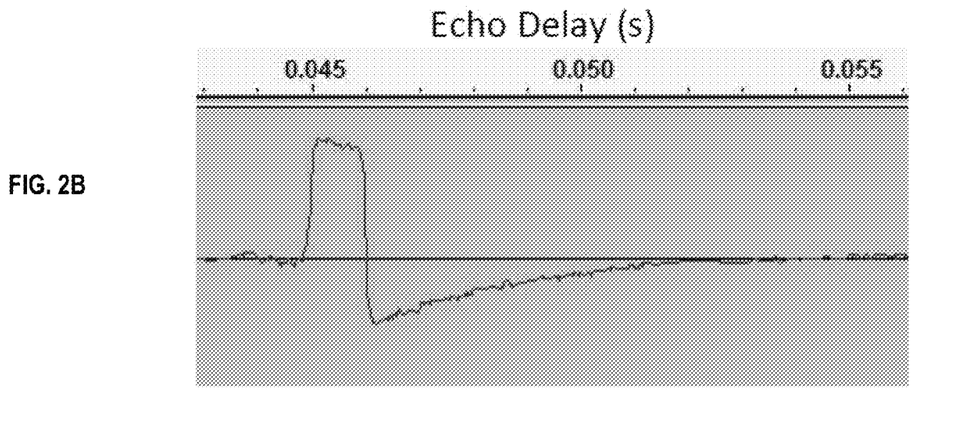

Along these lines, FIGS. 2A, 2B illustrate sonic echo profile responses for two different indoor locations. The illustrated responses are based on the emission of a 1 ms audio pulse signal at 20 kHz in each of the two rooms by a wireless device, in which FIG. 2A depicts the received echo profile measured by wireless communication device 102 in the first room and FIG. 2B depicts the received echo profile measured in the second room. The sound echo profile characteristics, as evidenced by the associated delays and amplitudes shown in FIGS. 2A, 2B, is affected by room dimensions, layout, furniture, and building materials to provide a unique sonic echo fingerprint for each room. As such, the sonic echo fingerprint may provide finer location resolution.

Figure 3:
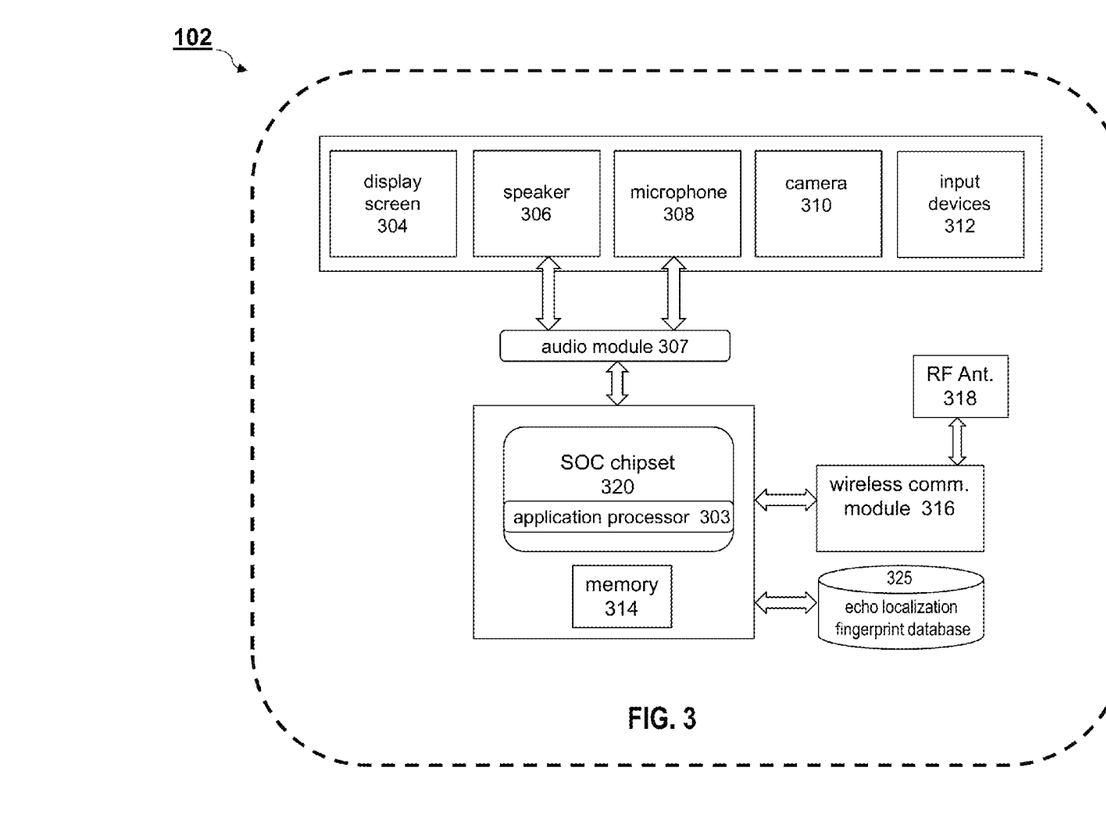
FIG. 3 depicts a flow diagram illustrating a sonic-assisted method of identifying location of wireless devices, in accordance with various aspects and principles of the present disclosure.

FIG. 3 depicts a high-level functional block diagram of wireless communication device 102 to be used in conjunction with a sonic-assisted wireless location identification system, in accordance with various aspects of the present disclosure. Wireless communication device 102 may comprise any electronic device capable of performing wireless communications under various standards and protocols, such as, for example, CDMA, GPRS, 3G or 4G, LTE, Wi-Fi, WiMax, WWAN, WLAN, WPAN, BlueTooth, BlueTooth Low Energy, or any other implementation of a suitable wireless standard. As such, wireless-enabled device 102 may take a variety of forms, such as, for example, a cellular/smart phone, laptop, mobile device, tablet computer, personal communication system (PCS) device, personal digital assistant (PDA), personal audio device (PAD), or any other consumer electronic device.

As depicted in FIG. 3, wireless communication device 102 includes a variety of peripherals, such as, for example, display screen 304, speaker 306, audio module 307, microphone 308, camera 310, input devices 312, as well as memory 314, communication module 316, antenna 318, a system-on-chip (SoC) chipset 320, and a sonic echo localization fingerprint database 325. Wireless communication device 102 may also include a bus infrastructure and/or other interconnection means to connect and communicate information between the various components of device 102.

In some embodiments, SoC 320 may be part of a core processing or computing unit of wireless communication device 102, and is configured to receive and process input data and instructions, provide output and/or control other components of device 102 in accordance with embodiments of the present disclosure. SoC 320 may include a microprocessor/application processor 303, a memory controller, a memory and other components. The microprocessor may further include a cache memory (e.g., SRAM), which along with the memory of SoC 320 may be part of a memory hierarchy to store instructions and data. The microprocessor may also include one or more logic modules such as a field programmable gate array (FPGA) or other logic array. Communication between the SoC 320's application processor and memory may be facilitated by the memory controller (or chipset), which may also facilitate communication with the peripheral components.

Memory 314 of wireless communication device 102 may be a dynamic storage device coupled to the bus infrastructure and configured to store information, instructions, and programs to be executed by processors of SoC 320 and/or other processors (or controllers) associated with device 102. Some or all of memory 314 may be implemented as Dual In-line Memory Modules (DIMMs), and may be one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device. Wireless communication device 102 may also include read only memory (ROM) and/or other static storage devices coupled to the bus infrastructure and configured to store static information and instructions for processors of SoC 320 and/or other processors (or controllers) associated with device 102.

Wireless communication module 316 of wireless communication device 102 may comprise transceivers, transponders, modulation/demodulation, and memory circuitry, configured to wirelessly communicate and transmit/receive information as well as establishing a wireless communication link via RF antenna 318.

Audio module 307 of wireless communication device 102 may be configured process signals received from microphone 308 as well as process signals to be transmitted through speaker 306. As such, audio module 307 may comprise circuitry and modules such as analog-to-digital (A/D) and digital-to-analog (D/A) converters, processors, encoder/decoders, compression/decompression units, modulators/demodulators, filters, mixers, volume/gain stages, FFT modules, delay measurements modules, amplitude detectors, correlation modules, etc.

In accordance with various aspects and principles of the present disclosure, audio module 307 may also be configured to generate a single sonic tone or multiple sonic tones to be outputted through speaker 306 as well process similar types of signals received through microphone 308. In some embodiments, audio module 307 may produce such sonic tone signals at audio frequencies (e.g., 20 Hz-20 kHz) or ultrasonic frequencies (e.g., 20 kHz-300 kHz). It will be appreciated that different frequencies will produce different results, providing diversity to improve the quality of measurements. As such, the use of multiple frequencies will yield more accurate location characterization.

The signal processing of the received echo signals may incorporate FFT algorithms, correlation algorithms, as well as other known techniques to extract signal characteristics (e.g., amplitude, frequency, delay) and mitigate/filter out noise and other unrelated signals received from the environment.

In certain embodiments, audio module 307 of wireless communication device 102 may not initially emit a sonic signal, but instead rely on external sources of sound (e.g., footsteps on a hard floor). In such a case, the measurement and processing would involve sound directly received from the source as a reference signal and the associated echo/reflected signals. Moreover, sound localization may also operate passively to classify or correlate the space or environment based on the footprint/signature of background noises. For example, a kitchen space may be identified by the hum noise of a refrigerator and/or the corresponding reflected noise signals while an office space may be identified by the hum noise of computer cooling fans, etc. Wireless communication device 102 may use any combination of these methods to best determine current position locations.

Sonic echo localization fingerprint database 325 of wireless communication device 102 may comprise a collection of previously-stored sonic echo fingerprint entries that are correlated with specific locations and/or spatial positions. Sonic echo localization fingerprint database 325 may be initially constructed by the user surveying different locations and performing the sonic-assisted process (described below) or by other suitable means. In addition to, or in the alternative, sonic echo localization fingerprint database 325 may be automatically established by employing the Simultaneous Localization and Mapping (SLAM) process, as disclosed in PCT/US 2012/035952, filed on 1 May 2012, entitled "SIMULTANEOUS LOCALIZATION AND MAPPING USING SPATIAL AND TEMPORAL COHERENCE FOR INDOOR LOCATION," the entire contents of which are incorporated by reference. Once sonic echo localization fingerprint database 325 has been constructed, currently-measured sonic echo profiles may be compared with the previously-stored sonic echo fingerprint entries by employing a matching algorithm, such as, for example, Euclidean distance, maximum likelihood, etc., to determine the current location of device 102.

While the disclosed embodiment depicts sonic echo localization fingerprint database 325 as being stored locally within wireless communication device 102, it will be appreciated that sonic echo localization fingerprint database 325 may be stored externally and capable of being accessed wirelessly by wireless communication device 102. For example, sonic echo localization fingerprint database 325 may be provisioned to a trusted, network-based (e.g., "cloud") entity, or communications provider, in which database 325 may be wirelessly accessed, operated on, and updated by an authorized or authenticated communication device.

Figure 4:
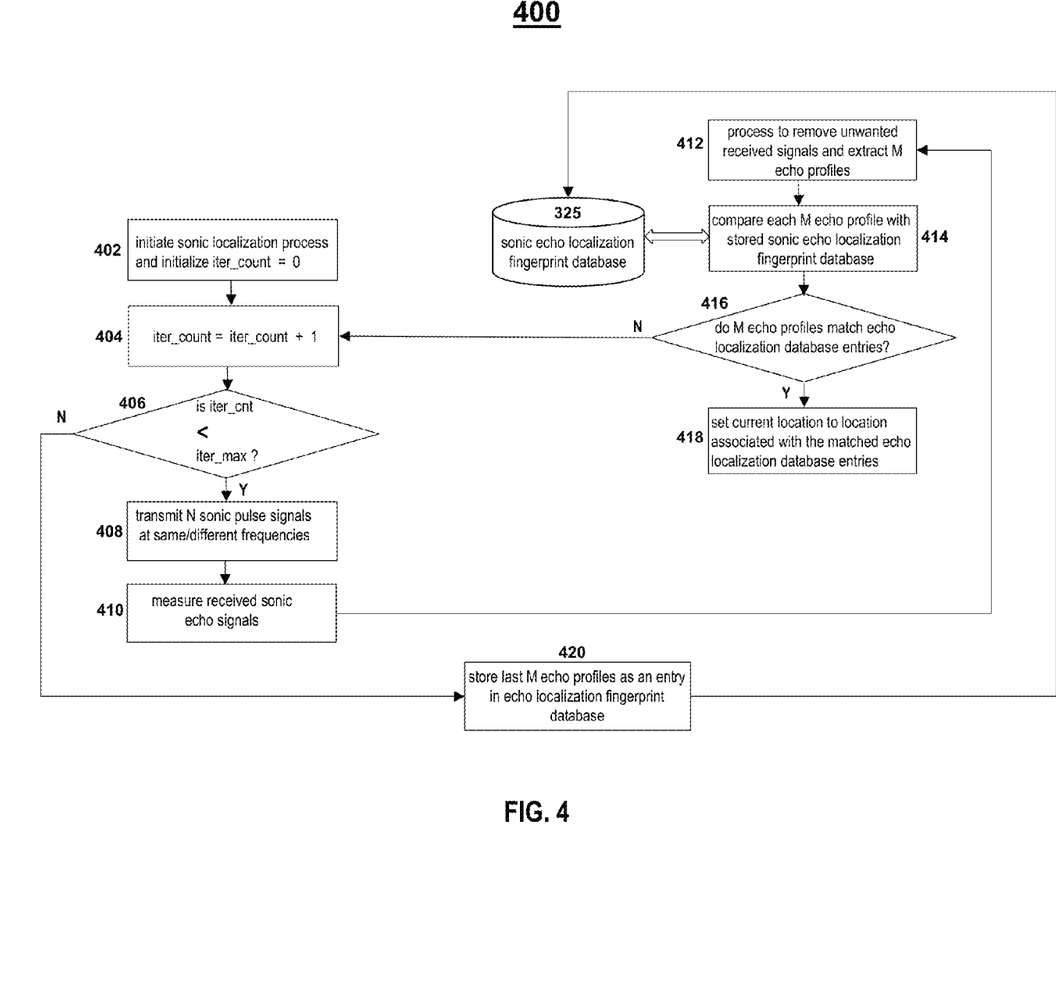
FIG. 4 depicts a flow diagram illustrating a sonic-assisted process of identifying location of wireless devices, in accordance with various aspects and principles of the present disclosure.

FIG. 4 depicts a flow diagram illustrating sonic-assisted process 400 for identifying the location of wireless communication device 102, in accordance with various aspects and principles of the present disclosure. At block 402, process 400 initiates sonic location and initializes the process iteration counter. At block 404, the iteration counter is incremented and at decision block 406, process 400 determines whether the iteration counter is less than a maximum count threshold. As will be made evident below, in the depicted embodiment, blocks 404 and 406 provide a mechanism which tracks the number of iterations that occur before process 400 determines that no match occurs between the currently-matched profiles and sonic echo localization fingerprint database 325 entries, thereby indicating that a new location has been determined for wireless communication device 102. For example, if iteration counter is greater than or equal to the maximum count threshold, process 400 advances to block 420 in which the last echo profiles are stored as a new entry to sonic echo localization fingerprint database 325.

Upon process 400 determining that iteration counter is less than the maximum count threshold, at block 408, wireless communication device 102 transmits N sonic pulse signals, via speaker 306, at one frequency or several different frequencies. As discussed above, the frequencies of the sonic pulse signals may operate at the audio frequency band (e.g., 20 Hz-20 kHz) or ultrasonic frequency band (e.g., 20 kHz-300 kHz) and use of different frequencies will generally yield improved measurements.

At block 410, microphone 308 of wireless communication device 102 receives the sonic echo signals reflected off of objects in the space currently occupied by device 102. The received echo signals are measured by audio module 307 of wireless communication device 102 and, at block 412, audio module 307 processes the measured received echo signals to filter out unwanted signals, such as background noise, conversations, music, appliances, etc., and to extract M echo profile characteristics of the relevant echo signals.

Armed with the current M echo profile characteristics, process 400 advances to block 414, where the current profile characteristics are compared with the sonic echo fingerprint entries previously-stored in sonic echo localization fingerprint database 325. As noted above, the comparison may be achieved by employing a matching algorithm, such as, for example, Euclidean distance, maximum likelihood, etc.

Process 400 then determines, at decision block 416, whether there exists a match between the current M echo profile characteristics and the previously-stored sonic echo fingerprint entries. If so, process 400 then sets the current location of wireless communication device 102 to the location correlated with the matched the previously-stored sonic echo fingerprint entry or entries, at block 418.

If no match exists between the current M echo profile characteristics and the previously-stored sonic echo fingerprint entries, then process 400 moves back to block 404, where the iteration counter is incremented and process 400 proceeds with another iteration of sonic-assisted location identification. In certain embodiments, process 400 may change the number of sonic pulse signals transmitted and/or the frequencies used in the iteration.

As noted above, if the iteration counter number is greater than or equal to the maximum count threshold, indicating that process 400 has reached its iteration limit, process 400 advances to block 420 in which the last echo profiles are stored as a new entry to sonic echo localization fingerprint database 325 and the location correlated with the echo profiles may be determined by techniques, such as, user input, SLAM localization, GPS or WiFi, etc. Alternatively, the last echo profiles may be simply stored in the database, deferring location determination but with information acknowledging that the current location has been previously visited (which may also be useful in certain scenarios).

While sonic-assisted process 400 has been described above as actuating wireless communication device 102 to transmit sonic pulse signals via speaker 306 and measure sonic echo signals received from microphone 308, it will be appreciated that modifications to process 400 may be incorporated, in accordance with various aspects of the present disclosure. For example, as noted above, wireless communication device 102 may not emit a signal, but instead rely on external sources of sound (e.g., footsteps on a hard floor) and echo/reflected signals. Alternatively or in addition to, process 400 may rely in passive listening and classify the environment to classify or correlate the space or environment based on the footprint/signature of background noises and/or their reflected noise signals (e.g., the humming noise of a refrigerator in a kitchen space or computer cooling fan noise of an office space). The measurement and processing of process 400 would then involve the sound directly received from the source as a reference signal as well as the associated echo/reflected signals.

In this manner, the disclosed embodiments provide the capability of identifying locations based on a sonic-assisted wireless device scheme.

EXAMPLES

The following examples pertain to various embodiments, in accordance with various aspects and principles of the present disclosure.

Example 1 is a wireless location identification method that provides transmitting, by a wireless device, at least one sonic signal operating on at least one acoustic frequency, receiving, by the wireless device, at least one echo signal indicative of the at least one sonic signal being reflected by objects in a current location, measuring the received at least one echo signal, processing the at least one echo signal to extract attributes of the echo signal and generate at least one echo profile characteristic, comparing the at least one profile characteristic with previously-stored sonic characteristics that are correlated with pre-identified locations, and setting the current location as a pre-identified location correlated to the previously-stored sonic characteristics that match the at least one profile characteristic.

In Example 2, the subject matter of Example 1 may optionally provide that the transmitting of the at least one sonic signal is performed by a speaker device integrated with the wireless device and the receiving of the at least one echo signal is performed by a microphone device integrated with the wireless device.

In Example 3, the subject matter of Example 1 may optionally provide that the at least one sonic signal operates at a frequency within a bandwidth of about 20 Hz to about 300 kHz while Example 4 may optionally provide that the at least one sonic signal comprises a plurality of pulse signals each operating at different frequencies within a bandwidth of about 20 Hz to about 300 kHz.

In Example 5, the subject matter of Example 1 may optionally provide that the processing of the at least one echo signal further includes filtering out received signals attributable to background noise.

In Example 6, the subject matter of Example 1 may optionally provide that the processing of the at least one echo signal further includes filtering out received signals attributable to background noise.

In Example 7, the subject matter of Example 1 may optionally include that the least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

In Example 8, the subject matter of Example 1 may optionally include that the previously-stored sonic characteristics are stored within the wireless device.

In Example 9, the subject matter of Example 1 may optionally provide that upon determining that no match exists between the previously-stored sonic characteristics and the at least one profile characteristic, continuing to perform the transmitting, receiving, measuring, processing and comparing operations until a match is found between the previously-stored sonic characteristics and the at least one profile characteristic or until a predetermined maximum number of iterations is reached. And, in Example 10, the subject matter of Example 1 may optionally provide that upon reaching the predetermined maximum number of iterations, storing the at least one profile characteristic as a new sonic characteristic.

Example 11 is a wireless location identification system, comprising a wireless device configured to transmit at least one sonic signal operating on at least one acoustic frequency and to receive at least one echo signal indicative of the at least one sonic signal being reflected by objects in a current location; an audio module configured to measure the received at least one echo signal and process the at least one echo signal to extract attributes of the echo signal and generate at least one echo profile characteristic; and logic configured to compare the at least one profile characteristic with previously-stored sonic characteristics that are correlated with pre-identified locations, wherein, the current location is identified to a pre-identified location correlated to the previously-stored sonic characteristics that match the at least one profile characteristic.

In Example 12, the subject matter of Example 11 may optionally include that the transmission of the at least one sonic signal is performed by a speaker device integrated with the wireless device and the reception of the at least one echo signal is performed by a microphone device integrated with the wireless device.

In Example 13, the subject matter of Example 11 may optionally include that the at least one sonic signal operates at a frequency within a bandwidth of about 20 Hz to about 300 kHz. And, in Example 14, the subject matter of Example 11 may optionally include that the at least one sonic signal comprises a plurality of pulse signals each operating at different frequencies within a bandwidth of about 20 Hz to about 300 kHz.

In Example 15, the subject matter of Example 11 may optionally include that the audio module is further configured to filter out received signals attributable to background noise.

In Example 16, the subject matter of Example 11 may optionally include that the at least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

In Example 17, the subject matter of Example 11 may optionally include that the previously-stored sonic characteristics are stored within the wireless device.

In Example 18, the subject matter of Example 11 may optionally include that upon the logic determining that no match exists between the previously-stored sonic characteristics and the at least one profile characteristic, continuing to perform the transmitting, receiving, measuring, processing and comparing operations until a match is found between the previously-stored sonic characteristics and the at least one profile characteristic or until a predetermined maximum number of iterations is reached. And in Example 19, the subject matter of Example 18 may optionally include that upon reaching the predetermined maximum number of iterations, the logic actuates storage of the at least one profile characteristic as a new sonic characteristic.

Example 20 is a computer-readable medium comprising computer-readable instructions physically embodied thereon which, when executed by a processor, causes the processor to perform a method to compute a position of a wireless device, the method comprising transmitting at least one sonic signal operating on at least one acoustic frequency; receiving at least one echo signal indicative of the at least one sonic signal being reflected by objects in a current location; measuring the received at least one echo signal; processing the at least one echo signal to extract attributes of the echo signal and generate at least one echo profile characteristic; comparing the at least one profile characteristic with previously-stored sonic characteristics that are correlated with pre-identified locations; and setting the current location as a pre-identified location correlated to the previously-stored sonic characteristics that match the at least one profile characteristic.

In Example 21, the subject matter of Example 20 may optionally include that the transmitting of the at least one sonic signal is performed by a speaker device integrated with the wireless device and that the receiving of the at least one echo signal is performed by a microphone device integrated with the wireless device.

In Example 22, the subject matter of Example 20 may optionally include that the at least one sonic signal operates at a frequency within a bandwidth of about 20 Hz to about 300 kHz. And, in Example 23, the subject matter of Example 20 may optionally include that the at least one sonic signal comprises a plurality of pulse signals each operating at different frequencies within a bandwidth of about 20 Hz to about 300 kHz.

In Example 24, the subject matter of Example 20 may optionally include that the processing of the at least one echo signal further includes filtering out received signals attributable to background noise.

In Example 25, the subject matter of Example 20 may optionally include that the at least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

In Example 26, the subject matter of Example 20 may optionally include that the previously-stored sonic characteristics are stored within the wireless device.

In Example 27, the subject matter of Example 20 may optionally include that upon determining that no match exists between the previously-stored sonic characteristics and the at least one profile characteristic, continuing to perform the transmitting, receiving, measuring, processing and comparing operations until a match is found between the previously-stored sonic characteristics and the at least one profile characteristic or until a predetermined maximum number of iterations is reached. And, in Example 28, the subject matter of Example 27 may optionally include that upon reaching the predetermined maximum number of iterations, storing the at least one profile characteristic as a new sonic characteristic.

Example 28 is a wireless location identification method that provides transmitting, by a wireless device, at least one sonic signal operating on at least one acoustic frequency, receiving, by the wireless device, at least one echo signal indicative of the at least one sonic signal being reflected by objects in a current location, measuring the received at least one echo signal, processing the at least one echo signal to extract attributes of the echo signal and generate at least one echo profile characteristic, comparing the at least one profile characteristic with previously-stored sonic characteristics that are correlated with pre-identified locations, and setting the current location as a pre-identified location correlated to the previously-stored sonic characteristics that match the at least one profile characteristic.

In Example 29, the subject matter of Example 28 may optionally provide that the transmitting of the at least one sonic signal is performed by a speaker device integrated with the wireless device and the receiving of the at least one echo signal is performed by a microphone device integrated with the wireless device.

In Example 30, the subject matter of Example 28 may optionally provide that the at least one sonic signal operates at a frequency within a bandwidth of about 20 Hz to about 300 kHz while Example 31 may optionally provide that the at least one sonic signal comprises a plurality of pulse signals each operating at different frequencies within a bandwidth of about 20 Hz to about 300 kHz.

In Example 32, the subject matter of Example 28 may optionally provide that the processing of the at least one echo signal further includes filtering out received signals attributable to background noise.

In Example 33, the subject matter of Example 28 may optionally provide that the processing of the at least one echo signal further includes filtering out received signals attributable to background noise.

In Example 34, the subject matter of Example 28 may optionally include that the least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

In Example 35, the subject matter of Example 28 may optionally include that the previously-stored sonic characteristics are stored within the wireless device.

In Example 36, the subject matter of Example 28 may optionally provide that upon determining that no match exists between the previously-stored sonic characteristics and the at least one profile characteristic, continuing to perform the transmitting, receiving, measuring, processing and comparing operations until a match is found between the previously-stored sonic characteristics and the at least one profile characteristic or until a predetermined maximum number of iterations is reached. And, in Example 37, the subject matter of Example 36 may optionally provide that upon reaching the predetermined maximum number of iterations, storing the at least one profile characteristic as a new sonic characteristic.

Example 38 is a wireless location identification system, comprising a wireless device configured to transmit at least one sonic signal operating on at least one acoustic frequency and to receive at least one echo signal indicative of the at least one sonic signal being reflected by objects in a current location; an audio module configured to measure the received at least one echo signal and process the at least one echo signal to extract attributes of the echo signal and generate at least one echo profile characteristic; and logic configured to compare the at least one profile characteristic with previously-stored sonic characteristics that are correlated with pre-identified locations, wherein, the current location is identified to a pre-identified location correlated to the previously-stored sonic characteristics that match the at least one profile characteristic.

In Example 39, the subject matter of Example 38 may optionally include that the transmission of the at least one sonic signal is performed by a speaker device integrated with the wireless device and the reception of the at least one echo signal is performed by a microphone device integrated with the wireless device.

In Example 40, the subject matter of Example 38 may optionally include that the at least one sonic signal operates at a frequency within a bandwidth of about 20 Hz to about 300 kHz. And, in Example 41, the subject matter of Example 10 may optionally include that the at least one sonic signal comprises a plurality of pulse signals each operating at different frequencies within a bandwidth of about 20 Hz to about 300 kHz.

In Example 42, the subject matter of Example 38 may optionally include that the audio module is further configured to filter out received signals attributable to background noise.

In Example 43, the subject matter of Example 38 may optionally include that the at least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

In Example 44, the subject matter of Example 38 may optionally include that the previously-stored sonic characteristics are stored within the wireless device.

In Example 45, the subject matter of Example 38 may optionally include that upon the logic determining that no match exists between the previously-stored sonic characteristics and the at least one profile characteristic, continuing to perform the transmitting, receiving, measuring, processing and comparing operations until a match is found between the previously-stored sonic characteristics and the at least one profile characteristic or until a predetermined maximum number of iterations is reached. And in Example 46, the subject matter of Example 45 may optionally include that upon reaching the predetermined maximum number of iterations, the logic actuates storage of the at least one profile characteristic as a new sonic characteristic.

Example 47 is a computer-readable medium comprising computer-readable instructions physically embodied thereon which, when executed by a processor, causes the processor to perform the method of any of Examples 28-37.

Example 48 is an apparatus comprising means for performing the method of any of Examples 28-37.

Example 49 is a wireless location identification method that provides transmitting, by a wireless device, at least one sonic signal operating on at least one acoustic frequency, receiving, by the wireless device, at least one echo signal indicative of the at least one sonic signal being reflected by objects in a current location, measuring the received at least one echo signal, processing the at least one echo signal to extract attributes of the echo signal and generate at least one echo profile characteristic, comparing the at least one profile characteristic with previously-stored sonic characteristics that are correlated with pre-identified locations, and setting the current location as a pre-identified location correlated to the previously-stored sonic characteristics that match the at least one profile characteristic.

In Example 50, the subject matter of Example 49 may optionally provide that the transmitting of the at least one sonic signal is performed by a speaker device integrated with the wireless device and the receiving of the at least one echo signal is performed by a microphone device integrated with the wireless device.

In Example 51, the subject matter of Example 49 may optionally provide that the at least one sonic signal operates at a frequency within a bandwidth of about 20 Hz to about 300 kHz while Example 52 may optionally provide that the at least one sonic signal comprises a plurality of pulse signals each operating at different frequencies within a bandwidth of about 20 Hz to about 300 kHz.

In Example 53, the subject matter of Example 49 may optionally provide that the processing of the at least one echo signal further includes filtering out received signals attributable to background noise.

In Example 54, the subject matter of Example 49 may optionally provide that the processing of the at least one echo signal further includes filtering out received signals attributable to background noise.

In Example 55, the subject matter of Example 49 may optionally include that the least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

In Example 56, the subject matter of Example 49 may optionally include that the previously-stored sonic characteristics are stored within the wireless device.

In Example 57, the subject matter of Example 49 may optionally provide that upon determining that no match exists between the previously-stored sonic characteristics and the at least one profile characteristic, continuing to perform the transmitting, receiving, measuring, processing and comparing operations until a match is found between the previously-stored sonic characteristics and the at least one profile characteristic or until a predetermined maximum number of iterations is reached. And, in Example 58, the subject matter of Example 57 may optionally provide that upon reaching the predetermined maximum number of iterations, storing the at least one profile characteristic as a new sonic characteristic.

Example 59 is a wireless location identification system, comprising a wireless device configured to transmit at least one sonic signal operating on at least one acoustic frequency and to receive at least one echo signal indicative of the at least one sonic signal being reflected by objects in a current location; an audio module configured to measure the received at least one echo signal and process the at least one echo signal to extract attributes of the echo signal and generate at least one echo profile characteristic; and logic configured to compare the at least one profile characteristic with previously-stored sonic characteristics that are correlated with pre-identified locations, wherein, the current location is identified to a pre-identified location correlated to the previously-stored sonic characteristics that match the at least one profile characteristic.

In Example 60, the subject matter of Example 59 may optionally include that the transmission of the at least one sonic signal is performed by a speaker device integrated with the wireless device and the reception of the at least one echo signal is performed by a microphone device integrated with the wireless device.

In Example 61, the subject matter of Example 59 may optionally include that the at least one sonic signal operates at a frequency within a bandwidth of about 20 Hz to about 300 kHz. And, in Example 62, the subject matter of Example 10 may optionally include that the at least one sonic signal comprises a plurality of pulse signals each operating at different frequencies within a bandwidth of about 20 Hz to about 300 kHz.

In Example 63, the subject matter of Example 59 may optionally include that the audio module is further configured to filter out received signals attributable to background noise.

In Example 64, the subject matter of Example 59 may optionally include that the at least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

In Example 65, the subject matter of Example 59 may optionally include that the previously-stored sonic characteristics are stored within the wireless device.

In Example 66, the subject matter of Example 59 may optionally include that upon the logic determining that no match exists between the previously-stored sonic characteristics and the at least one profile characteristic, continuing to perform the transmitting, receiving, measuring, processing and comparing operations until a match is found between the previously-stored sonic characteristics and the at least one profile characteristic or until a predetermined maximum number of iterations is reached. And in Example 67, the subject matter of Example 59 may optionally include that upon reaching the predetermined maximum number of iterations, the logic actuates storage of the at least one profile characteristic as a new sonic characteristic.

Example 68 is a computer-readable medium comprising computer-readable instructions physically embodied thereon which, when executed by a processor, causes the processor to perform the method of any of Examples 49-58.

Example 69 is an apparatus comprising means for performing the method of any of Examples 49-58.

Example 70 is a wireless location identification method that provides transmitting, by a wireless device, at least one sonic signal operating on at least one acoustic frequency, receiving, by the wireless device, at least one echo signal indicative of the at least one sonic signal being reflected by objects in a current location, measuring the received at least one echo signal, processing the at least one echo signal to extract attributes of the echo signal and generate at least one echo profile characteristic, comparing the at least one profile characteristic with previously-stored sonic characteristics that are correlated with pre-identified locations, and setting the current location as a pre-identified location correlated to the previously-stored sonic characteristics that match the at least one profile characteristic.

In Example 71, the subject matter of Example 70 may optionally provide that the transmitting of the at least one sonic signal is performed by a speaker device integrated with the wireless device and the receiving of the at least one echo signal is performed by a microphone device integrated with the wireless device.

In Example 72, the subject matter of Example 70 may optionally provide that the at least one sonic signal operates at a frequency within a bandwidth of about 20 Hz to about 300 kHz while Example 73 may optionally provide that the at least one sonic signal comprises a plurality of pulse signals each operating at different frequencies within a bandwidth of about 20 Hz to about 300 kHz.

In Example 74, the subject matter of Example 70 may optionally include that the least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

In Example 75, the subject matter of Example 70 may optionally include that upon determining that no match exists between the previously-stored sonic characteristics and the at least one profile characteristic, continuing to perform the transmitting, receiving, measuring, processing and comparing operations until a match is found between the previously-stored sonic characteristics and the at least one profile characteristic or until a predetermined maximum number of iterations is reached. And, in Example 76, the subject matter of Example 75 may optionally provide that upon reaching the predetermined maximum number of iterations, storing the at least one profile characteristic as a new sonic characteristic.

Example 76 is a wireless location identification system, comprising a wireless device configured to transmit at least one sonic signal operating on at least one acoustic frequency and to receive at least one echo signal indicative of the at least one sonic signal being reflected by objects in a current location; an audio module configured to measure the received at least one echo signal and process the at least one echo signal to extract attributes of the echo signal and generate at least one echo profile characteristic; and logic configured to compare the at least one profile characteristic with previously-stored sonic characteristics that are correlated with pre-identified locations, wherein, the current location is identified to a pre-identified location correlated to the previously-stored sonic characteristics that match the at least one profile characteristic.

In Example 77, the subject matter of Example 76 may optionally include that the transmission of the at least one sonic signal is performed by a speaker device integrated with the wireless device and the reception of the at least one echo signal is performed by a microphone device integrated with the wireless device.

In Example 78, the subject matter of Example 76 may optionally include that the at least one sonic signal operates at a frequency within a bandwidth of about 20 Hz to about 300 kHz. And, in Example 79, the subject matter of Example 76 may optionally include that the at least one sonic signal comprises a plurality of pulse signals each operating at different frequencies within a bandwidth of about 20 Hz to about 300 kHz.

In Example 80, the subject matter of Example 76 may optionally include that the at least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

In Example 81, the subject matter of Example 76 may optionally include that upon the logic determining that no match exists between the previously-stored sonic characteristics and the at least one profile characteristic, continuing to perform the transmitting, receiving, measuring, processing and comparing operations until a match is found between the previously-stored sonic characteristics and the at least one profile characteristic or until a predetermined maximum number of iterations is reached. And in Example 81, the subject matter of Example 80 may optionally include that upon reaching the predetermined maximum number of iterations, the logic actuates storage of the at least one profile characteristic as a new sonic characteristic.

Example 82 is a computer-readable medium comprising computer-readable instructions physically embodied thereon which, when executed by a processor, causes the processor to perform the method of any of Examples 70-74.

Example 80 is an apparatus comprising means for performing the method of any of Examples 70-74.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the scope of the exemplary aspects of this disclosure. For example, while the descriptions have been directed to audio-based technologies, it should be appreciated that the components, techniques, and processes disclosed may be combined with wireless system RF-based technologies to provide different characteristics in location error, and thereby improve location accuracy.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful aspects of the disclosure, it is to be understood that such detail is solely for that purpose, and that the appended claims are not limited to the disclosed aspects, but, on the contrary, are intended to cover modifications and equivalent arrangements that are within the spirit and scope of the disclosed aspects.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A wireless location identification method, comprising:
   transmitting, by a wireless device, a sonic signal operating at an acoustic frequency;
   receiving, by the wireless device, an echo signal indicative of the sonic signal being reflected by an object;
   determining at least one echo profile characteristic of the echo signal;
   comparing the at least one echo profile characteristic with previously-stored echo profile characteristics, wherein the previously-stored echo profile characteristics are extracted from previously-received echo signals at pre-identified locations and are stored in a memory; and
   when the at least one echo profile characteristic matches at least one of the previously-stored echo profile characteristics, setting a current location of the wireless device as one of the pre-identified locations corresponding to the at least one of the previously-stored echo profile characteristics.

2. The wireless method of claim 1, wherein the transmitting of the at least one sonic signal is performed by a speaker device integrated with the wireless device, and wherein one of the pre-identified locations corresponds to a noise signal characteristic.

3. The wireless method of claim 1, wherein the receiving of the at least one echo signal is performed by a microphone device integrated with the wireless device.

4. The wireless method of claim 1, wherein the at least one sonic signal operates at a frequency within a bandwidth of about 20 Hz to about 300 kHz.

5. The wireless method of claim 1, wherein the at least one sonic signal comprises a plurality of pulse signals each operating at different frequencies within a bandwidth of about 20 Hz to about 300 kHz.

6. The wireless method of claim 1, wherein the processing of the at least one echo signal further includes filtering out received signals attributable to background noise including a received signal having the noise signal characteristic.

7. The wireless method of claim 1, wherein the at least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

8. The wireless method of claim 1, further comprising, upon determining that no match exists between the previously-stored echo profile characteristics and the at least one profile characteristic, continuing to perform the transmitting, receiving, determining and comparing operations until a match is found between the previously-stored echo profile characteristics and the at least one profile characteristic or until a predetermined maximum number of iterations is reached.

9. The wireless method of claim 8, further comprising, upon reaching the predetermined maximum number of iterations, storing the at least one echo profile characteristic.

10. A wireless location identification system, comprising:
   a transceiver configured to transmit a sonic signal operating at an acoustic frequency and to receive an echo signal indicative of the sonic signal being reflected by an object
   an audio module configured to, determine at least one echo profile characteristic of the echo signal; and
   logic configured to compare the at least one echo profile characteristic with previously-stored echo profile characteristics, wherein the previously-stored echo profile characteristics are extracted from previously-received echo signals at pre-identified locations and are stored in a memory, and to set a current location of the wireless location identification system as one of the pre-identified locations corresponding to at least one of the previously-stored echo profile characteristics when the at least one echo profile characteristic matches the at least one of the previously-stored echo profile characteristics.

11. The wireless system of claim 10, wherein the transmission of the at least one sonic signal is performed by a speaker device integrated with the wireless device, and wherein one of the pre-identified locations corresponds to a noise signal characteristic.

12. The wireless system of claim 10, wherein the reception of the at least one echo signal is performed by a microphone device integrated with the wireless device.

13. The wireless system of claim 10, wherein the at least one sonic signal operates at a frequency within a bandwidth of about 20 Hz to about 300 kHz.

14. The wireless system of claim 10, wherein the at least one sonic signal comprises a plurality of pulse signals each operating at different frequencies within a bandwidth of about 20 Hz to about 300 kHz.

15. The wireless system of claim 10, wherein the audio module is further configured to filter out received signals attributable to background noise including a received signal having the noise signal characteristic.

16. The wireless system of claim 10, wherein the at least one echo profile characteristic includes one or more of the following attributes: amplitude of the at least one echo signal, frequency of the at least one echo signal, delay of the at least one echo signal, Doppler shift of the at least one echo signal, direction of wireless device movement, and speed of wireless device movement.

17. The wireless system of claim 10, wherein, upon the logic determining that no match exists between the previously-stored echo profile characteristics and the at least one profile characteristic, continuing to perform the transmitting, receiving, determining and comparing operations until a match is found between the previously-stored echo profile characteristics and the at least one profile characteristic or until a predetermined maximum number of iterations is reached.

18. The wireless system of claim 17, wherein, upon reaching the predetermined maximum number of iterations, the logic actuates storage of the at least one echo profile characteristic.

19. The wireless method of claim 1, wherein the comparing the at least one echo profile characteristic with the previously-stored echo profile characteristics comprises comparing at least two echo profile characteristics of the echo signal with the previously-stored echo profile characteristics, wherein the at least two echo profile characteristics of the echo signal are selected from an amplitude, an acoustic frequency, and a delay of the echo signal.

20. The wireless system of claim 10, wherein the comparing the at least one echo profile characteristic with the previously-stored echo profile characteristics comprises comparing at least two echo profile characteristics of the echo signal with the previously-stored echo profile characteristics, wherein the at least two echo profile characteristics of the echo signal are selected from an amplitude, an acoustic frequency, and a delay of the echo signal.

* * * * *